United States Patent [19]

Stein

[11] Patent Number: 4,830,007
[45] Date of Patent: May 16, 1989

[54] FETUS LEARNING SYSTEM

[76] Inventor: Ivan W. Stein, 24 Inwood La., Bristol, Conn. 06010

[21] Appl. No.: 116,041

[22] Filed: Nov. 2, 1987

[51] Int. Cl.⁴ ............................................. A61N 1/00
[52] U.S. Cl. ............................................. 128/421
[58] Field of Search ...................... 128/1 R, 1 C, 24 R, 128/42 1; 434/250, 112, 288; 381/98, 104, 107, 109; 213/250, 112, 266

[56] References Cited

U.S. PATENT DOCUMENTS

| | | |
|---|---|---|
| 3,122,847 | 3/1964 | Redfield et al. |
| 3,983,483 | 9/1976 | Pendo. |
| 4,008,614 | 2/1977 | Silva et al. |
| 4,073,416 | 2/1978 | McComber. |
| 4,340,972 | 7/1982 | Heist. |
| 4,382,793 | 5/1983 | Anderson ........................ 128/1 R |

OTHER PUBLICATIONS

Paul Span, "Sound Advice".
ABC' News, 20/20, "Small Man on Campus", 10-30-86.
Martha Nelson, *Omni*, "Listening in the Womb", Mortimer G. Rosen.
"The Secret Brain", *Science*, Studying Learning in the Womb, 7-20-84.
*Science*, "The Development of Fetal Learning", 11-4-83, Grossmann.
Heath, "Born Smart", Mar. 1985.

*Primary Examiner*—Edward M. Coven
*Attorney, Agent, or Firm*—Lee C. Robinson, Jr.

[57] ABSTRACT

A device for delivering recorded auditory information to a human fetus in utero in a female. The device includes a playback device for translating recorded auditory information into corresponding electrical signals, a vibrating transducer for transducing said electrical signals into audible vibrations corresponding to said auditory information. The vibrating transducer is adapted to be positioned in substantially solid contact with the external surface of the abdominal area of the female carrying said fetus with substantially no free air space between the vibrating transducer and said external surface of said abdominal area so that vibrations of the vibrating transducer will vibrate the abdominal area of the female to cause auditory vibrations in the uterus of the female which can be heard by the fetus. A system of straps is provided to maintaining the vibrating transducers in substantially solid contact with the external surface of the abdomen of the female, which straps are adjustable to accommodate an increase in size of the abdominal area of the female which occurs during gestation of the fetus.

11 Claims, 1 Drawing Sheet

FETUS LEARNING SYSTEM

FIELD OF THE INVENTION

This invention relates generally to learning systems for fetuses while still in utero, and in particular to an apparatus for delivering auditory information to a human fetus in utero.

BACKGROUND OF THE INVENTION

It has recently been discovered that a human fetus which is still in the uterus of the mother can hear sound after between twenty-four and twenty-eight weeks of gestation. In fact, it has been found that at least some fetuses are capable of remembering some of what they hear in utero after birth. Thus, it is now known that fetuses are not relatively insensitive to stimulation as was previously believed. Recent research has indicated that human fetuses whose mothers read aloud various stories to them in utero recognized and preferred those stories after birth. Indeed many parents of very high I.Q. children have attributed the high I.Q. of their children to such parental reading aloud by the mother.

Despite this recognition of the benefits of prenatal learning, no feasible means of systematically imparting information to a fetus has been devised. Reading aloud by the mother is inconsistent and relies upon the mother's willingness to do such reading on a regular basis. Furthermore, it is impractical for the mother to perform such reading aloud in public places or while working. Still further, it is highly desirable to impart information to the fetus in many fields of discipline, such as physics, mathematics or foreign languages, with which the mother may not be familiar.

OBJECTS OF THE INVENTION

Accordingly, it is an object of the present invention to provide an apparatus for imparting auditory information to fetuses in utero which does not rely on reading aloud by the mother.

It is a further object of the present invention to provide an apparatus for imparting auditory information to a fetus in utero which can use pre-recorded information on a wide variety of topics.

It is a still further object of the invention to provide an apparatus for imparting auditory information to a fetus in utero in a manner which will not be disturbing to other persons, or distracting to the mother.

It is yet a further object of the invention to provide a means for adjustably retaining auditory transducers on the abdominal area of a pregnant female which will hold the auditory transducers firmly to the abdominal area of the pregnant female, and which are adjustable not only to accommodate the change in size of the abdominal area that occurs during pregnancy, but also to be able to locate the transducers across the abdominal area for optimum transmission of undistorted auditory information.

SUMMARY OF THE INVENTION

The present invention provides a device for delivering auditory information to a human or animal fetus in utero in a female which includes a device for translating auditory information into corresponding electrical signals, a vibrating transducer for transducing said electrical signal into audible vibrations corresponding to said auditory information. The vibrating transducer is adapted to be positioned in substantially solid contact with the external surface of the abdominal area of the female carrying said fetus with substantially no free air space between the vibrating transducer and said external surface of said abdominal area. In this way, vibrations of the vibrating transducer will vibrate the abdominal area of the female to cause auditory vibrations in the uterus of the female which can be heard by the fetus. The invention further provides means for maintaining the vibrating transducers in substantially solid contact with the external surface of the abdomen of the female, the means being adjustable so as to accommodate an increase in size of the abdominal area of the female throughout the term of the carrying of the fetus and also to be able to optimally locate the transducers across the abdominal area to avoid distortion of the auditory vibrations being transmitted to the fetus, such as might otherwise occur with a partially filled bladder, for example.

DETAILED DESCRIPTION

Figure 1:
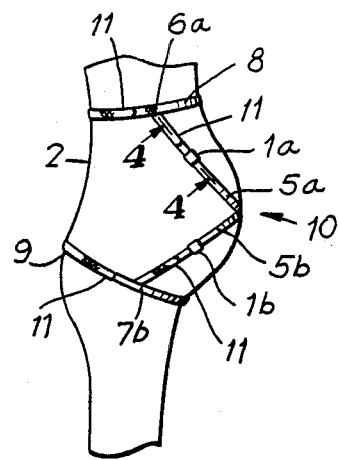
FIG. 1 is a side view of the torso of a pregnant female wearing a device constructed in accordance with a preferred embodiment of the present invention and adapted to accomplish the method of the present invention.
Figure 2:
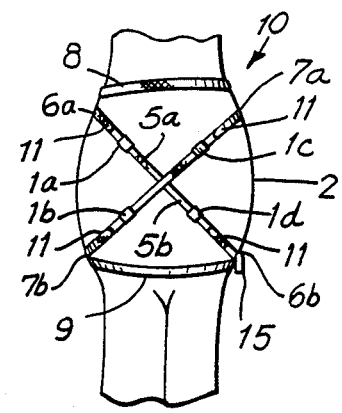
FIG. 2 is a front view of the torso of a pregnant female wearing the device of FIG. 1.
Figure 3:
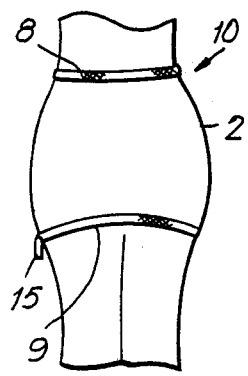
FIG. 3 is a rear view of the torso of a pregnant female wearing the device of FIG. 1.

Referring now to the drawings in detail, and initially to FIGS. 1 and 2, a fetus learning device 10 is illustrated mounted on the torso 2 of a pregnant female. The fetal learning device 10 includes four vibrating transducers 1a, 1b, 1c and 1d spaced approximately equidistantly around the front of the abdominal area of the pregnant female. Although it is preferred that the vibrating transducers be spaced substantially equidistantly as depicted, variations from the position shown will also accomplish the purposes of the invention. Although four vibrating transducers are depicted, it is also contemplated that the device will work effectively with two transducers positioned substantially at the locations 1a and 1c, 1b and 1d, 1a and 1d or 1b and 1c. If two transducers are utilized instead of four, it is preferred to position the speakers at the locations 1b and 1d, because the fetus is generally positioned in an upside down orientation in utero. A single transducer can also be used, although less effectively. The us of multiple vibrating transducers is preferred because it provides more effective and assured transmission of the auditory information to the fetal ear, regardless of changes in position of the fetus or of distortion or occlusion of the transmission of the auditory information from one or more of the transducers by functioning organs located within the pregnant female's abdomen.

The vibrating transducers 1a, 1b, 1c and 1d can be commercially available speakers, provided that the vibrating portion of the speaker is positioned substantially in firm contact with the external surface of the abdomen of the wearer.

It is important that the vibrating transducers be held in relatively close and solid contact with the abdominal area of the wearer so as to conduct the auditory vibrations by direct solid vibration, rather than through the air as an intermediate medium. This is because air is a relatively inefficient transmitter of auditory vibrations to the uterus, and even with very high volume, very little acoustic energy can be transmitted via the air into the uterus of the wearer. Furthermore, by maintaining the transducers in substantially firm contact with the abdominal area of the wearer, the auditory vibrations will be readily transmitted to the fetus, but be relatively inaudible to the mother or to persons in the vicinity. Such contact and transmission may be further enhanced by the use of a gel which is applied either on the abdomen or on the transducer face prior to placement against the abdomen. The gel may be derived from a solution of gelatine or other thickening agent in water.

In order to achieve the best acoustic transmission of the auditory vibrations into the uterus of the wearer, it is preferred that the vibrating portion of the transducers be positioned in direct contact with the skin of the wearer. However, if this is inconvenient, the transducers can also be positioned outside of clothing worn by wearer, provided that the clothing is relatively thin, and the transducers are held in firm contact with the abdominal area of the wearer to minimize acoustic losses and distortion due to the intervening layer of clothing. Such loss and distortion may be further reduced by applying a gel to saturate the fabric prior to the placement of the transducers.

In order to maintain the transducers in firm contact with the abdomen of the wearer, a unique strapping system is provided. The preferred strapping means, as depicted in FIGS. 1 through 5, includes two straps 5a and 5b which criss-cross the front of the abdominal area of the wearer. The transducers 1a and 1d are slidably mounted on the strap 5a on opposite sides of the crossing point with the strap 5b, and the transducers 1b and 1c similarly slidably mounted on the strap 5b. With this arrangement, the positions of the transducers may be adjusted to permit optimum placement on the abdomen for best transmission of undistorted auditor vibrations to the fetus.

The straps 5a and 5b have distal ends 6a, 6b, and 7a, 7b, respectively. The straps are supported at their distal ends 6a, 6b and 7a, 7b, respectively by an upper strap 8 and a lower strap 9. Upper strap 8 is adapted to encircle the torso of the wearer generally at the upper portion of the abdominal area. Lower strap 9 is adapted to encircle the torso of the wearer at generally the lower portion of the abdominal area.

Figure 4:
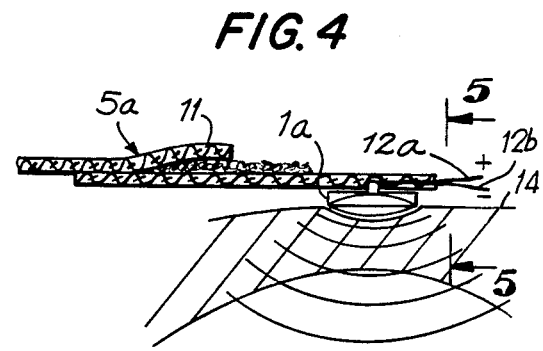
FIG. 4 is a sectional view taken along the line 4—4 of the strap adjustment means indicated in FIG. 1.

During the course of a normal pregnancy, significant enlargement of the abdominal area occurs. In view of this, it is necessary that straps 5a, 5b and 8 and 9 have adjustment means for accommodating this significant expansion, while still maintaining the vibrating transducers in firm contact with the abdominal area. To accomplish this, each of the straps 5a, 5b and 8, 9 include adjustment means 11 for adjusting the length of the strap. These adjustment means are conveniently a VELCRO-type self gripping fastener, as depicted in FIG. 4, or can be snaps, double "D"-rings, buckles, or other means. It is preferred that the adjustment means 11 on straps 5a and 5b be positioned at points distal from the positions of the vibrating transducers 1a, 1b, 1c and 1d. Such positioning ensures that the relative spacing of the transducers can be maintained during the course of the pregnancy regardless of changes in size and the nature of the adjustment made by the wearer. The position of the adjustment means on straps 8 and 9 should preferably be positioned rearward of the point of attachment of the distal ends of straps 5a and 5b to the upper and lower straps 8 and 9 to help maintain the relative positioning of the straps 5a and 5b regardless of the adjustments made to strap 8 and 9. Furthermore, the straps themselves are preferably made of a relatively elastic material so that the fetal learning device can be worn comfortably by the wearer with the transducers in firm contact with the abdominal area regardless of changes in position of the wearer, such as sitting or standing and also to accommodate small increases in size in the abdomen of the wearer without requiring excessively frequent adjustment.

In the illustrated embodiment of the invention the fetus learning system also includes a device for playing back recorded information 15, which is conveniently a conventional cassette or microcassette or disc-type player. The playback device 15 is connected to the vibrating transducers 1a, 1b, 1c, and 1d by means of wires 12a and 12b positioned inside the straps 5a, 5b so that the wires will not be uncomfortable to the wearer. In other embodiments the auditory information is generated by a microphone connected to the vibrating transducers.

Figure 5:
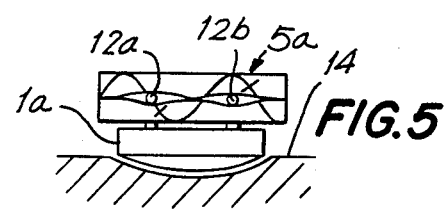
FIG. 5 is a sectional view taken along the line 5—5 of the adjustment means for the straps indicated in FIG. 4.

To use the fetus learning system of the illustrated embodiment, the user inserts a cassette, for example, with prerecorded auditory information into the player 15. Alternatively, the auditory information may be produced by speaking directly into a microphone. The auditory information can be on any topic, including foreign languages, English, geology, mathematics, physics etc. The player or microphone changes the information into corresponding electrical impulses in a well known manner, which impulses are transported via wires 12a and 12b to the transducers 1a, 1b, 1c, and 1d. The electrical impulses cause corresponding vibrations 13 in the vibrating transducers which, in turn, cause direct vibration of the abdominal wall 14. The vibrating abdominal wall 14 causes corresponding vibrations of the auditory information in the amniotic fluid 15 contained within the womb of the pregnant woman, as depicted in FIG. 5, which vibrations are detected as sound by the developing fetus. Because the transducers are held in relatively firm contact with the abdominal area, the vibrations of the vibrating transducers are transmitted directly into the abdominal area and hence to the amniotic fluid, without passing through the intermediate medium of the air. In this way, neither the woman wearing the device, nor persons in the immediate area will significantly hear the auditory information being imparted to the fetus.

Accordingly, it will be seen that by means of the present invention a simple, reliable and relatively automatic fetus learning system is provide, which efficiently transmits auditory information to the fetus without the need for vocalization by the woman carrying the fetus, and without disturbing either the woman or others in the immediate vicinity with the auditory information.

The terms and expressions which have been employed herein are used as terms of description and not of the limitation, and there is no intention in the use of such terms or expressions of excluding any equivalence of the features shown and described in portions thereof. Although illustrative embodiments of the invention have been described herein with reference to the accompanying drawings, it is to be understood that various changes and modifications can be effected therein without departing from the scope or spirit of the invention.

What is claimed is:

1. A device for delivering auditory information to a fetus in utero in a female, the device comprising, means for converting auditory information into corresponding electrical signal, a vibrating auditory transducer for transducing said electrical signals into audible vibrations corresponding to said auditory information, said vibrating auditory transducer being adapted to be positioned in substantially solid contact with the external surface of the abdominal area of the female carrying said fetus with substantially no free air space between said vibrating auditory transducer and said external surface of said abdominal area so that vibrations of said vibrating auditory transducer will vibrate the abdominal area of the female to cause auditory vibrations in the uterus of the female which can be heard by the fetus, and means for maintaining said vibrating transducer in substantially solid contact with the external surface of the abdomen of the female, said means being adjustable so as to accommodate an increase in size of the abdominal area of the female throughout the term of gestation of the fetus.

2. The device defined in claim 1, wherein there are at least two vibrating auditory transducers spaced apart on the abdominal area of the female.

3. The device as defined in claim 1, wherein there are four vibrating auditory transducers substantially equidistantly spaced apart on the frontal portion of the abdominal area of the female.

4. The device as defined in claim 1, wherein said maintaining means comprise straps adapted to extend around the periphery of the torso of the female.

5. The device as defined in claim 4, wherein said maintaining means further includes straps adapted to criss-cross the frontal abdominal area of the female, said criss-crossing straps having distal ends, and wherein said vibrating auditory transducers are adjustably attached near the distal ends of at least some of said criss-crossing straps.

6. The device as defined in claim 1, wherein said maintaining means includes a substantially horizontal circumferential strap adapted to surround the torso of the female near the upper portion of the abdominal area, and a second substantially horizontal circumferential strap adapted to surround the torso of the female near the lower portion of the abdominal area, each of said straps including means for adjusting the length of said strap to accommodate changes in size of the abdominal area during the course of carrying the fetus and for maintaining the straps in firm position around the torso of the female, a pair of criss-crossing straps, said criss-crossing straps having distal ends, said distal ends being connected to said upper and lowers straps so that when worn by the female carrying the fetus, said criss-crossing straps will criss-cross over the frontal area of the abdomen of the female, and wherein said vibrating auditory transducers are adjustably mounted to at least one of said criss-crossing straps, said distal ends of said criss-crossing straps including means for adjusting the length of said straps to accommodate changes in size of the abdominal area occurring during carrying of the fetus.

7. The device as defined in claim 1, wherein said vibrating auditory transducer is adapted to be positioned in substantially solid contact with the skin of the abdominal area of the female carrying said fetus so that there is no layer of clothing interposed between said vibrating auditory transducer and said skin.

8. The device as defined in claim 1, wherein said vibrating auditory transducer is adapted to be positioned in substantially solid contact with the abdominal area of the female carrying said fetus, with a layer of clothing interposed between said vibrating transducer and said skin.

9. A device for delivering auditory information to a fetus in utero in a female, the device comprising, a playback device for translating recorded auditory information into corresponding electrical signals, a vibrating auditory transducer for transducing said electrical signals into audible vibrations corresponding to said auditory information, said vibrating auditory transducer being adapted to be positioned in substantially solid contact with the external surface of the abdominal are of the female carrying said fetus with substantially no free air space between said vibrating auditory transducer and said external surface of said abdominal area so that vibrations of said vibrating auditory transducer will vibrate the abdominal area of the female to cause auditory vibrations in the uterus of the female which can be heard by the fetus, and means for maintaining said vibrating auditory transducers in substantially solid contact with the external surface of the abdomen of the female, said means being adjustable so as to accommodate an increase in size of the abdominal area of the female throughout the term of gestation of the fetus.

10. The device as defined in claim 7, wherein said vibrating auditory transducer is adapted to be positioned in substantially solid contact with the skin of the abdominal area of the female carrying said fetus without a layer of clothing interposed between said vibrating auditory transducer and said skin.

11. The device as defined in claim 7, wherein said vibrating auditory transducer is adapted to be positioned in substantially solid contact with abdominal area of the female carrying said fetus, with a layer of clothing interposed between said vibrating auditory transducer and said skin.

* * * * *